(12) United States Patent
Yasaki et al.

(10) Patent No.: US 9,807,199 B2
(45) Date of Patent: Oct. 31, 2017

(54) INFORMATION PROCESSING APPARATUS, DATA PROVISION METHOD, AND STORAGE MEDIUM

(71) Applicant: FUJITSU LIMITED, Kawasaki-shi, Kanagawa (JP)

(72) Inventors: Koichi Yasaki, Kawasaki (JP); Zhaogong Guo, Koto (JP); Hideki Tanaka, Kawasaki (JP); Koichi Yokota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 13/918,146

(22) Filed: Jun. 14, 2013

(65) Prior Publication Data

US 2014/0032648 A1  Jan. 30, 2014

(30) Foreign Application Priority Data

Jul. 24, 2012 (JP) ................. 2012-163758

(51) Int. Cl.
  G06F 15/16 (2006.01)
  H04L 29/06 (2006.01)
  H04L 29/08 (2006.01)

(52) U.S. Cl.
  CPC .............. H04L 67/42 (2013.01); H04L 67/02 (2013.01); H04L 67/1097 (2013.01); H04L 63/083 (2013.01)

(58) Field of Classification Search
  CPC ......... H04L 67/02; H04L 67/03; H04L 67/04; H04L 67/42; H04L 67/1097;
  (Continued)

(56) References Cited

U.S. PATENT DOCUMENTS 6,185,568 B1 * 2/2001 Douceur et al. .............. 707/770
6,185,598 B1   2/2001 Farber et al.
(Continued)

FOREIGN PATENT DOCUMENTS

JP    5-274210      10/1993
JP    2002-503001   * 1/2002
(Continued)

OTHER PUBLICATIONS

Office Action issued by the Japanese Patent Office dated Apr. 19, 2016 in corresponding Japanese patent application No. 2012-163758.

(Continued)

*Primary Examiner* — David Lazaro
*Assistant Examiner* — Berhanu Shitayewoldetsad
(74) *Attorney, Agent, or Firm* — Staas & Halsey LLP

(57) ABSTRACT

An information processing apparatus includes an interface unit configured to connect to a network, a storage unit configured to store data which is provided with an apparatus that is an issuer of the data request, a provision unit configured to accept a provision request for a provision of data to the apparatus that is an issuer of the data request from an information providing apparatus configured to communicate via the interface unit, and provide data stored in the storage unit to the apparatus that is the issuer of the data request, an input unit configured to accept an input operation performed by a user, and a stopping unit configured to, in a case where a predefined condition is satisfied, make the provision unit stop the provision of the data to the apparatus that is the issuer of the data request.

8 Claims, 13 Drawing Sheets

(58) Field of Classification Search
CPC . H04L 63/083; H04L 29/06; H04L 29/08576; H04L 51/32; H04L 51/18; H04L 67/28; G06F 17/30
USPC ........ 709/246, 203–245; 711/133, 113, 118, 711/126, 162, 137, 103, 8
See application file for complete search history.

(56) References Cited

U.S. PATENT DOCUMENTS

| | | | |
|---|---|---|---|
| 8,615,630 B2 * | 12/2013 | Pantos | G06F 12/121 711/100 |
| 8,745,341 B2 * | 6/2014 | Turk | G06F 12/0862 711/162 |
| 2001/0037358 A1 * | 11/2001 | Clubb et al. | 709/203 |
| 2002/0062384 A1 * | 5/2002 | Tso | 709/229 |
| 2002/0138551 A1 * | 9/2002 | Erickson | 709/203 |
| 2002/0194434 A1 * | 12/2002 | Kurasugi | 711/137 |
| 2003/0037268 A1 * | 2/2003 | Kistler | 713/310 |
| 2003/0056144 A1 * | 3/2003 | Itoh | G06F 1/24 714/15 |
| 2003/0115421 A1 * | 6/2003 | McHenry et al. | 711/133 |
| 2003/0135464 A1 * | 7/2003 | Mourad et al. | 705/50 |
| 2003/0217057 A1 | 11/2003 | Kuroiwa et al. | |
| 2003/0220904 A1 * | 11/2003 | Nagata | G06Q 10/10 |
| 2004/0064574 A1 * | 4/2004 | Kurauchi | 709/231 |
| 2004/0077362 A1 * | 4/2004 | Chinomi et al. | 455/456.5 |
| 2005/0086364 A1 * | 4/2005 | Muti et al. | 709/235 |
| 2005/0154781 A1 * | 7/2005 | Carlson et al. | 709/203 |
| 2005/0246347 A1 * | 11/2005 | Kobayashi | 707/10 |
| 2005/0262246 A1 * | 11/2005 | Menon et al. | 709/226 |
| 2005/0278389 A1 * | 12/2005 | Maze et al. | 707/200 |
| 2006/0034259 A1 * | 2/2006 | Matsuda | H04L 12/2803 370/352 |
| 2006/0059252 A1 * | 3/2006 | Tatsubori et al. | 709/223 |
| 2006/0149786 A1 * | 7/2006 | Nishiyama | 707/200 |
| 2006/0174198 A1 * | 8/2006 | Brown et al. | 715/530 |
| 2006/0184667 A1 * | 8/2006 | Clubb et al. | 709/224 |
| 2006/0230120 A1 * | 10/2006 | Yasuda | H04L 29/06027 709/217 |
| 2007/0106748 A1 * | 5/2007 | Jakobsson et al. | 709/217 |
| 2007/0174853 A1 * | 7/2007 | Turk | 719/330 |
| 2007/0233898 A1 * | 10/2007 | Raviv et al. | 709/238 |
| 2007/0233957 A1 * | 10/2007 | Lev-Ran et al. | 711/118 |
| 2008/0091895 A1 * | 4/2008 | Chen | 711/162 |
| 2008/0208961 A1 * | 8/2008 | Kim et al. | 709/203 |
| 2008/0228772 A1 * | 9/2008 | Plamondon | 707/10 |
| 2008/0228864 A1 * | 9/2008 | Plamondon | 709/203 |
| 2008/0228899 A1 * | 9/2008 | Plamondon | 709/219 |
| 2008/0228938 A1 * | 9/2008 | Plamondon | 709/233 |
| 2008/0229017 A1 * | 9/2008 | Plamondon | 711/118 |
| 2008/0229020 A1 * | 9/2008 | Plamondon | 711/122 |
| 2008/0229021 A1 * | 9/2008 | Plamondon | 711/125 |
| 2008/0229023 A1 * | 9/2008 | Plamondon | 711/126 |
| 2008/0229024 A1 * | 9/2008 | Plamondon | 711/126 |
| 2008/0229025 A1 * | 9/2008 | Plamondon | 711/126 |
| 2008/0263240 A1 | 10/2008 | Kori et al. | |
| 2009/0006736 A1 * | 1/2009 | Pantos et al. | 711/113 |
| 2009/0016354 A1 * | 1/2009 | Isobe | 370/395.4 |
| 2009/0063687 A1 * | 3/2009 | Turk | 709/227 |
| 2009/0064194 A1 * | 3/2009 | Turk | 719/319 |
| 2009/0094377 A1 * | 4/2009 | Zahavi et al. | 709/232 |
| 2009/0094417 A1 * | 4/2009 | Carlson et al. | 711/137 |
| 2009/0113068 A1 * | 4/2009 | Fujihira | H04L 67/1095 709/231 |
| 2009/0138582 A1 * | 5/2009 | Turk | 709/223 |
| 2009/0157678 A1 * | 6/2009 | Turk | 707/6 |
| 2009/0177778 A1 * | 7/2009 | Turk | 709/227 |
| 2009/0182941 A1 * | 7/2009 | Turk | 711/118 |
| 2010/0030424 A1 * | 2/2010 | Kitagawa | B60K 35/00 701/36 |
| 2010/0087179 A1 * | 4/2010 | Makavy et al. | 455/418 |
| 2010/0153546 A1 * | 6/2010 | Clubb et al. | 709/224 |
| 2011/0022568 A1 * | 1/2011 | Kim | G06F 17/30073 707/640 |
| 2011/0066704 A1 * | 3/2011 | Nakamura | 709/219 |
| 2011/0270954 A1 * | 11/2011 | Kikkawa | H04L 12/2812 709/219 |
| 2011/0271007 A1 * | 11/2011 | Wang et al. | 709/238 |
| 2012/0011281 A1 * | 1/2012 | Hamada et al. | 709/246 |
| 2012/0034906 A1 * | 2/2012 | Ueno | H04W 4/02 455/414.1 |
| 2012/0079167 A1 * | 3/2012 | Yao | G06F 12/0246 711/103 |
| 2012/0110113 A1 * | 5/2012 | Lee et al. | 709/214 |
| 2012/0239775 A1 * | 9/2012 | Hubbard et al. | 709/217 |
| 2012/0239811 A1 * | 9/2012 | Kohli et al. | 709/226 |
| 2012/0259946 A1 * | 10/2012 | Stockhammer et al. | 709/217 |
| 2012/0284371 A1 * | 11/2012 | Begen et al. | 709/219 |
| 2012/0311003 A1 * | 12/2012 | Kuznetsov et al. | 707/827 |
| 2013/0031197 A1 * | 1/2013 | Delos Reyes et al. | 709/213 |
| 2013/0042015 A1 * | 2/2013 | Begen et al. | 709/231 |
| 2013/0054756 A1 * | 2/2013 | Do | 709/219 |
| 2013/0089142 A1 * | 4/2013 | Begen et al. | 375/240.12 |
| 2013/0110910 A1 * | 5/2013 | Ikeda | 709/203 |
| 2013/0145099 A1 * | 6/2013 | Liu et al. | 711/133 |
| 2013/0179489 A1 * | 7/2013 | Daley et al. | 709/203 |
| 2013/0316675 A1 * | 11/2013 | Luna et al. | 455/408 |
| 2014/0129667 A1 * | 5/2014 | Ozawa | 709/213 |

FOREIGN PATENT DOCUMENTS

| | | | |
|---|---|---|---|
| JP | 2002503001 | * | 1/2002 |
| JP | 2003-339000 | | 11/2003 |
| JP | 2005-50267 | * | 2/2005 |
| JP | 200550267 | * | 2/2005 |
| JP | 2007-328736 | | 12/2007 |
| JP | 2008-90626 | | 4/2008 |
| JP | 2011-180820 | | 9/2011 |

OTHER PUBLICATIONS

Office Action issued by the Japanese Patent Office dated Nov. 29, 2016 in corresponding Japanese patent application No. 2012-163758.

* cited by examiner

FIG. 5

|  | Global IP | Local IP | WLAN adhoc | Bluetooth (REGISTERED TRADEMARK) |
|---|---|---|---|---|
| TERMINAL(1) | GR 1 | GR 1 | GR 1 | GR 1 |
| TERMINAL(2) | GR 1 | GR 2 | GR 2 | GR 2 |
| TERMINAL(3) | GR 1 | GR 3 | GR 1 | GR 3 |
| TERMINAL(4) | GR 4 | GR 3 | GR 4 | GR 1 |

FIG. 6

| TERMINAL ID | NETWORK PROPERTY | STORED DATA | FREE SPACE OF STORAGE DEVICE | POWER STATUS | CPU LOAD | NETWORK LOAD | PASSWORD/ PORT NUMBER | HOLD TIME |
|---|---|---|---|---|---|---|---|---|
| TERMINAL(1) | (global: x.y.z.001, local: 192.168.0.22) | | SSD: 10 GB RAM: 1 GB WAKE ON: DISABLED | WAKE ON: DISABLED | CPU UTILIZATION: 10% | NETWORK UTILIZATION: 1 Mbps | | |
| TERMINAL(2) | (global: x.y.z.001, local: 192.168.0.23) | Site A: a.jpeg b.mp4 c.iso | SSD: 10 GB RAM: 1 GB WAKE ON: DISABLED | WAKE ON: DISABLED | CPU UTILIZATION: 10% | NETWORK UTILIZATION: 0 Mbps | TERMINAL(1) IS ACCESSING PORT "5029" USING PASSWORD "xxx" TO ACQUIRE "b.mp4" | 1000 sec |
| TERMINAL(3) | | Site A: c.iso | SSD: 2 GB RAM: 1 GB WAKE ON: ENABLED (CURRENTLY POWERED ON) | WAKE ON: ENABLED (CURRENTLY POWERED ON) | CPU UTILIZATION: 0% | NETWORK UTILIZATION: 0 Mbps | TERMINAL(1) IS ACCESSING PORT "5129" USING PASSWORD "yyy" TO ACQUIRE "c.iso" | 2000 sec |

FIG. 10

```
<html><body>
<script>func1(){
        if (it is possible to acquire a.jpg from terminal(3)){
            Div id1 = replace with a.jpg acquired from
            terminal(3) and return OK to cache server
        }else{
            acquire address PC x as a substitution for
            terminal(3) from cache server
            while (it is impossible to acquire a.jpg from PC x){
                x = x + 1; acquire address PC x from cache server
            } Div id1 = replace with a.jpg acquired from terminal x
            and return OK to cache server}</script>
<div id = id1></body><html>
```

FIG. 12

```
<html><body>
<script>func1(){
        if (it is possible to acquire a.jpg from cache server){
            Div id1 = replace with a.jpg acquired from
            cache server and return OK to cache server
        }else{
            acquire a.jpg from content server
            Div id1 = replace with a.jpg acquired from content
            server and return OK to cache server}</script>
<div id = id1></body><html>
```

FIG. 13

| TERMINAL ID | NETWORK PROPERTY | STORED DATA | FREE SPACE OF STORAGE DEVICE | POWER STATUS | CPU LOAD | NETWORK LOAD | PASSWORD/ PORT NUMBER | HOLD TIME |
|---|---|---|---|---|---|---|---|---|
| TERMINAL(1) | (global: x.y.z.001, local: 192.168.0.22) | Site A: b.mp4, c.iso | SSD: 10 GB RAM: 1 GB WAKE ON: DISABLED | WAKE ON: DISABLED | CPU UTILIZATION: 10% | NETWORK UTILIZATION: 1 Mbps | | |
| TERMINAL(2) | (global: x.y.z.001, local: 192.168.0.23) | Site A: a.jpeg, b.mp4, c.iso | SSD: 10 GB RAM: 1 GB WAKE ON: DISABLED | WAKE ON: DISABLED | CPU UTILIZATION: 10% | NETWORK UTILIZATION: 0 Mbps | | |
| TERMINAL(3) | | Site A: c.iso | SSD: 2 GB RAM: 1 GB WAKE ON: ENABLED (CURRENTLY POWERED ON) | WAKE ON: ENABLED (CURRENTLY POWERED ON) | CPU UTILIZATION: 0% | NETWORK UTILIZATION: 0 Mbps | | |

INFORMATION PROCESSING APPARATUS, DATA PROVISION METHOD, AND STORAGE MEDIUM

CROSS-REFERENCE TO RELATED APPLICATION

This application is based upon and claims the benefit of priority from the prior Japanese Patent Application No. 2012-163758 filed on Jul. 24, 2012, the entire contents of which are incorporated herein by reference.

FIELD

The embodiments discussed herein are related to an information processing apparatus, a data provision method, and a storage medium.

BACKGROUND

A system is known which is configured to divide a content to be provided into a plurality of pieces of data, and store the divided data in a plurality of storage terminals. When a content provision request is received from a terminal, address information of the storage terminals is sent to the terminal that sent the content provision request. In this content distribution system, depending on the status of the storage terminals serving to store the divided data, a server makes a determination as to the number of pieces into which the content is to be divided, the selection of terminal, etc.

However, in the known content distribution system described above, a network port is maintained in an open state. Besides, an increase may occur in a processing load when contents are distributed, which may cause a restraint in operation of the terminal.

A description of a related technique may be found, for example, in Japanese Laid-open Patent Publication No. 2005-50267.

SUMMARY

According to an aspect of the embodiments, an information processing apparatus includes, an interface unit configured to connect to a network, a storage unit configured to store data which is provided with an apparatus, a provision unit configured to accept a provision request for a provision of data to the apparatus that is an issuer of the data request from an information providing apparatus configured to communicate via the interface unit, and provide data stored in the storage unit to the apparatus that is the issuer of the data request, an input unit configured to accept an input operation performed by a user, and a stopping unit configured to, in a case where a predefined condition including a detection of the input operation performed by the user on the input unit is satisfied, make the provision unit stop the provision of the data to the apparatus that is the issuer of the data request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a connection relation database.

FIG. 6 is a diagram illustrating an example of a stored-data database.

FIG. 10 is a diagram illustrating an example of an HTML content generated by an HTML generator.

FIG. 12 is a diagram illustrating an example of an HTML content generated by an HTML generator when a data provision request is not issued to a terminal.

FIG. 13 is a diagram illustrating a content of a stored-data database updated from the content illustrated in FIG. 6 so as to reflect a change that a terminal(1) has completed acquisition of data "b.mp4" and data "c.iso".

DESCRIPTION OF EMBODIMENTS

Embodiments are described below with reference to accompanying drawings.

More specifically, an information processing apparatus, a data provision method, and a data provision program according to embodiments are described below with reference to figures.

Hardware Configuration

Figure 1:
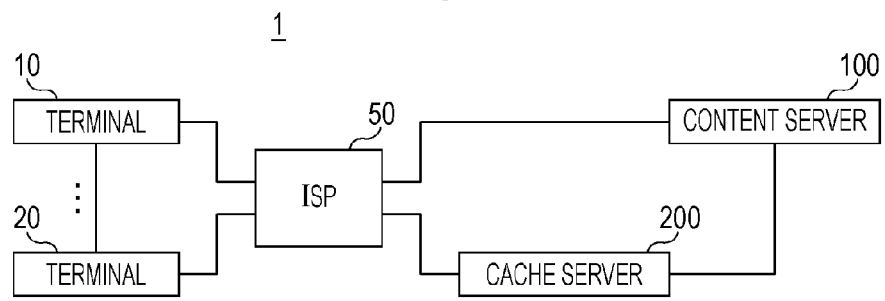
FIG. 1 is a diagram illustrating an example of a system configuration of a network system according to an embodiment.

FIG. 1 illustrates an example of a system configuration of a network system 1 according to an embodiment. The network system 1 includes a plurality of terminals including terminals 10 and 20, a content server 100, and a cache server 200.

Each terminal may be, for example, a user terminal used by a user. In the following description, when there is no difference among terminals, a simple expression a "terminal" is used. A terminal is connected to an Internet Services Provider (ISP) 50 via, for example, a router and a connection line, and connected to the content server 100 and the cache server 200 via the ISP 50.

The terminals are connected to each other via a network such as a local area network (LAN) such that the terminals are allowed to communicate with each other without passing through the ISP 50.

The ISP 50 includes a Point-Of-Presence (POP), a network operation center (NOC), or a similar facility including a router, a switch, a server, etc. The ISP 50 performs a process including user authentication, protocol conversion, etc. to connect a terminal to the content server 100 or the cache server 200.

The content server 100 is, for example, a Web server. In response to a data request from a terminal, the content server 100 provides content data stored therein or data generated by performing information processing to the terminal via the ISP 50.

The cache server 200, for example, captures the data provided to the terminal from the content server 100 and stores the captured data. In response to a data request from a terminal, the cache server 200 provides the stored content data to the terminal via the ISP 50. When the content server 100 accepts a data request from a terminal, the content server 100 specifies the cache server 200 whose location is closer to the terminal that issued the data request than the location of the content server 100, and the content server 100 instructs the terminal to access the specified cache server 200. In response, the terminal issues a data request to the cache server 200. In addition to capturing the data provided to the terminal from the content server 100, the cache server 200 may also store a particular set of data specified by the content server 100.

In a case where terminals are connected to an intranet of an organization such as a corporation, the cache server 200 may be installed under a contract between the organization and a provider or an operator of the content server 100. By installing the cache server 200, it becomes possible for the terminals possessed by the organization to acquire data of interest from the cache server 200 which allows a shorter communication time than the content server 100, as long as the data of interest is stored in the cache server 200. Thus, the terminals possessed by the organization are allowed to acquire data at a high speed. In this situation of the relationship, each terminal recognizes the existence of the installed cache server 200 and knows an IP address or the like of the cache server 200. In the following description, such a situation of the relationship is assumed.

Figure 2:
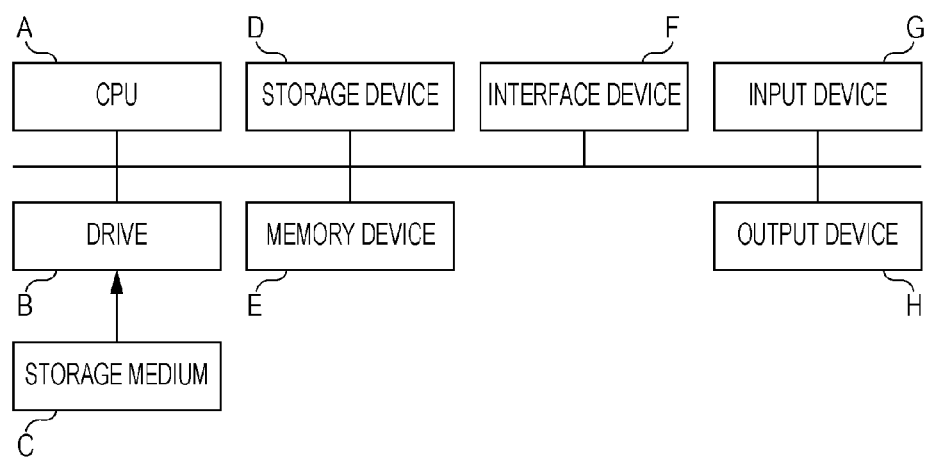
FIG. 2 is a diagram illustrating an example of a hardware configuration applicable to a terminal, a content server, and a cache server.

FIG. 2 illustrates an example of a hardware configuration that may be applied to the terminals 10 and 20, the content server 100, and the cache server 200 (hereinafter, these will be generically referred to as the terminal 10 or the like). The terminal 10 or the like includes, for example, a central processing unit (CPU) A, a drive B, a storage device D, a memory device E, an interface device F, an input device G, and an output device H. These constituent elements are connected to each other via a bus, a serial line, or the like. Each of the terminal 10 and the like may include a read only memory (ROM), a direct memory access (DMA) controller, an interrupt controller, and/or the like.

The CPU A is a processor including, for example, a program counter, an instruction decoder, various operation units, a load stored unit (LSU), a general register and the like. The drive B is an apparatus that allows it to read a program or data from a storage medium C. When the storage medium C in which the program is stored is mounted in the drive B, the program is installed from the storage medium C into the storage device D or the like via the drive B. The storage medium C is, for example, a portable storage medium such as a compact disc (CD), a digital versatile disc (DVD), a universal serial bus (USB) memory, or the like. The storage device D is, for example, a hard disk drive (HDD), a solid state drive (SSD), or the like.

Instead of installing the program using the storage medium C in the above-described manner, the program may be installed in such a manner that the interface device F downloads the program from another computer via a network and installs the downloaded program into the storage device D. The network may be the Internet, a LAN, a wireless network, or the like. The network may or may not include the ISP 50. Alternatively, the program may be stored in advance in the storage device D, a ROM, or the like when the terminal 10 or the like is shipped.

The memory device E is, for example, a random access memory (RAM). The interface device F includes, for example, a network interface card (NIC) and controls a connection to the network.

The input device G may be, for example, a keyboard, a mouse, a button, a touch pad, a touch panel, a microphone, or the like. The output device H may be, for example, a display device such as a liquid crystal display (LCD), cathode ray tube (CRT), a printer, a speaker, or the like.

Note that the terminal 10, terminal 20, the content server 100, and the cache server 200 do not have to have completely the same hardware configuration. Each may be configured such that one or more elements are removed from the hardware configuration illustrated in FIG. 2, one or more elements may be replaced with other elements, or one or more other elements may be added.

Logical Configuration

Figure 3:
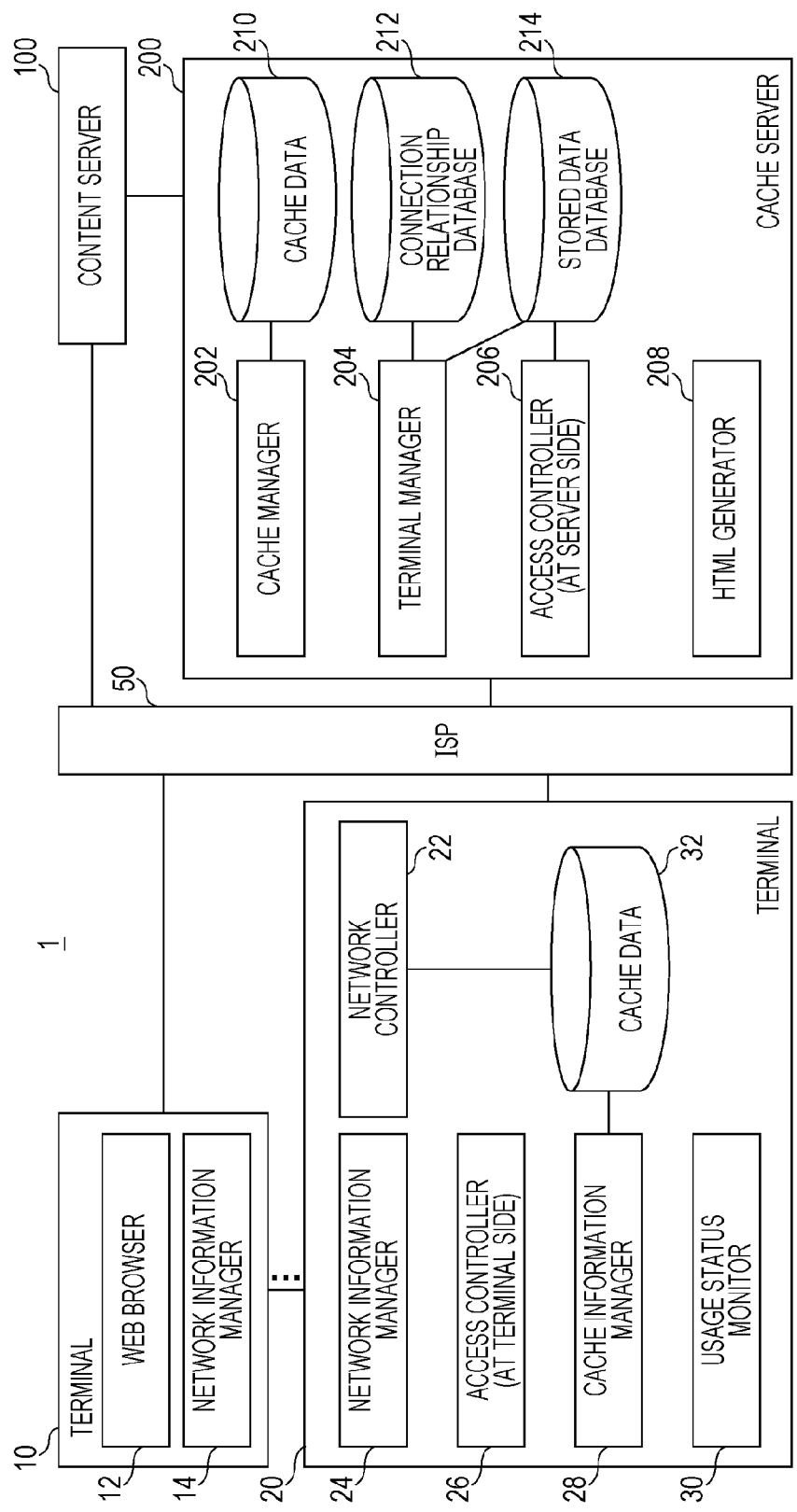
FIG. 3 is a diagram illustrating an example of a logical configuration of each constituent element of a network system in a particular state.

FIG. 3 illustrates an example of a logical configuration of each constituent element in the network system 1 in a particular state.

In the terminal 10, which is supposed to issue a data request, for example, a Web browser 12 and a network information manager 14 are in operation. The Web browser 12 interprets a uniform resource locator (URL) input by a user and transmits a hypertext transfer protocol (HTTP) request message (hereinafter referred to simply as a data request) to the content server 100. More specifically, the Web browser 12 transmits the data request to the content server 100 via the ISP 50. The network information manager 14 detects a connection relationship between the terminal 10 and other terminals and transmits information about the connection relationship to the cache server 200.

In the cache server 200, for example, a cache manager 202 is operating to manage cache data 210 stored in the storage device D.

Furthermore, in the cache server 200, for example, a terminal manager 204 that controls data provision requests issued to a plurality of terminals including the terminals 10 and 20, an access controller (at server side) 206, and an HTML generator 208 are in operation. The terminal manager 204 manages a connection relation database 212 and a stored-data database 214 set in the storage device D or the memory device E.

In the terminal 20 which receives the data provision request, for example, a network control unit 22, a network information manager 24, an access controller (at terminal side) 26, a cache information manager 28, and an usage status monitor 30 are in operation. The cache information manager 28 manages cache data 32 stored in the storage device D.

The network control unit 22 controls transmitting/receiving information to/from other terminals or to/from the content server 100 or the cache server 200 via the ISP 50. The network information manager 24 detects a connection relationship between the terminal 10 and other terminals and transmits information about the connection relationship to the cache server 200.

When a data provision request is received from the cache server 200, the access controller (at terminal side) 26 instructs the network control unit 22 to provide data included in the cache data 32 to the terminal 10 according to the data request from the terminal 10. Hereinafter, such a provision of data will be referred to as a data provision service. The cache information manager 28 manages cache data 32 used in the data provision service.

After the access controller (at terminal side) 26 receives the data provision request from the cache server 200, when a state of the terminal 20 satisfies a predefined condition, the usage status monitor 30 controls the operation to stop the data provision service, and furthermore the usage status monitor 30 transmits information to the cache server 200 to notify that the data provision service has been stopped.

Note that the terminal 20 in the above-described embodiments is an example of an "information processing apparatus", the network control unit 22 and the access controller (at terminal side) 26 are examples of a "provision unit", and the usage status monitor 30 is an example of a "stopping unit". The storage device D in the embodiments described above is an example of a "storage unit", and the input device G is an example of an "input unit". Note that the "input unit" is not limited to that realized by hardware such as the input device G, but the "input unit" may be an input interface in the terminal 20.

Furthermore, the terminal 10 in the embodiments described above is an example of an "apparatus that is an issuer of the data request", and the content server 100 and the cache server 200 are examples of an "information providing apparatus".

Each functional unit illustrated in FIG. 3 functions, for example, by performing a program by a CPU. The programs of the functional units do not have to be completely independent, but the programs may be subroutines or functions that are called by other programs. One or more of the functional units may be realized by hardware such as an LSI (Large Scale Integrated circuit), an IC (Integrated Circuit), an FPGA (Field Programmable Gate Array), or the like.

The state illustrated in FIG. 3 is merely an example. For example, the roles of the terminals 10 and 20 may be replaced with each other, or the terminals 10 and 20 each may receive a data provision request while issuing a data request. Therefore, depending on the state, the access controller (at terminal side), the usage status monitor, and/or the like may also operate in the terminal 10, and the Web browser may also operate in the terminal 20.

Flow of Process

Figure 4:
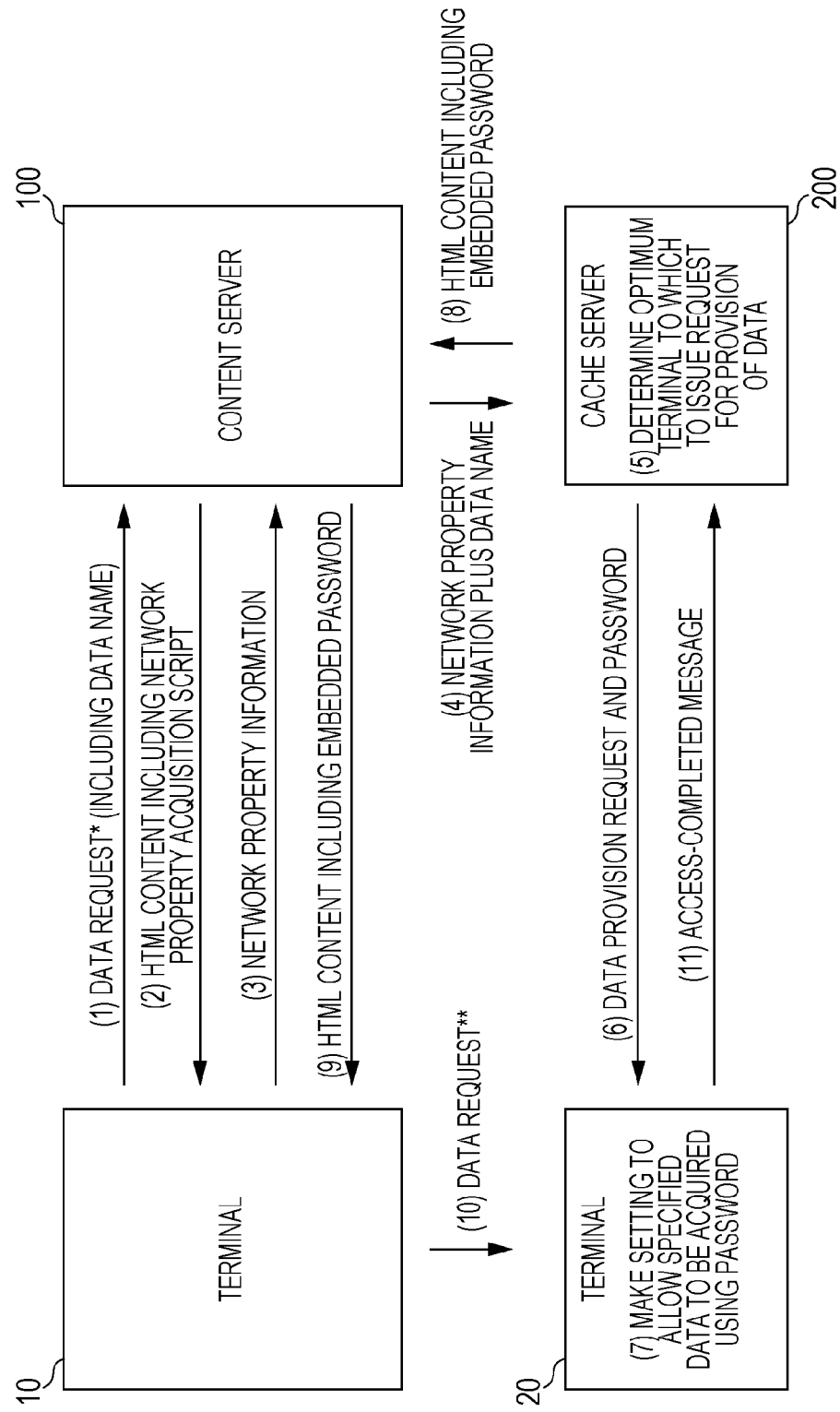
FIG. 4 is a diagram illustrating part of a flow of information and a process performed when a terminal issues a data request to a content server.

FIG. 4 is a diagram illustrating part of a flow of information and a process performed when the terminal 10 issues a data request to the content server 100. In the following description, numerals in parentheses correspond to numerals in parentheses described in FIG. 4.

First, when the terminal 10 issues a first-stage data request* to the content server 100 (1), the content server 100 returns an HTML content including a network property acquisition script to the terminal 10 (2). The terminal 10 executes the network property acquisition script and transmits network property information to the content server 100 (3).

The content server 100 transmits the network property information received from the terminal 10 and a data name associated with the data request to the cache server 200 (4).

The cache server 200 determines an optimum terminal to which to issue the data provision request (5), and transmits the data provision request and a password to the terminal 20 determined as the optimum terminal to which to issue the data provision request (6). The terminal 20 sets an internal state to make it possible to provide the requested data using the password (7).

Furthermore, the cache server 200 transmits an HTML content including the embedded password to the content server 100 (8). The content server 100 transfers the HTML content including the embedded password to the terminal 10 (9).

The terminal 10 transmits a second-stage data request using the received password to the terminal 20 thereby acquiring the data (10). Thereafter, the terminal 20 transmits an access-completed message to the cache server 200 (11), and thus the process associated with one data request is completed. Note that the second-stage data request illustrated in FIG. 4 is an example of a "data request" described in claims.

The processes illustrated in FIG. 4 are individually described in further detail below. The cache server 200 refers to the connection relation database 212 using the network property information acquired via the processes (1) to (3) illustrated in FIG. 4.

Terminal Manager

FIG. 5 illustrates an example of the connection relation database 212 managed by the terminal manager 204. The terminal manager 204 edits related items of the connection relation database 212 based on the information obtained via the communication with the network information managers (14, 24, etc.) of the respective terminals. As described above, each terminal recognizes the existence of the cache server 200, and the network information manager of each terminal is set to transmit information such as a network property of the terminal, for example, at predetermined intervals to the cache server 200. In FIG. 5, the terminals are denoted as terminal(1), terminal(2), and so on.

In FIG. 5, data labels "Global Internet Protocol (IP)" and "Local IP" indicate groups (subnets) based on the connection relationship with a router, and "Global IP" is an address used in connecting the Internet, and "Local IP" is an address used in a local network. Therefore, a group having the same value of "Global IP" is greater in size than a group having the same value of "Local IP". Furthermore, in FIG. 5, a data label "Wireless LAN (WLAN) adhoc" indicates a group in which terminals are directly connected via a wireless LAN. Furthermore, in FIG. 5, a data label "Bluetooth (registered trademark)" indicates a group in which terminals are connected via a Bluetooth network. In FIG. 5, data values GR1, GR2, GR3, and GR4 indicate groups into which terminals are grouped according to the above-described grouping scheme.

The access controller (at server side) 206 is capable of estimating a communication time (a time spent for communication) between the terminal 10 and another terminal by using the network property transmitted from the terminal 10 and the connection relation database 212 such as that illustrated in FIG. 5.

In the example illustrated in FIG. 5, communication times are estimated such that the communication time between terminals belonging to the same group in terms of the data label "Local IP" is shorter than the communication time between terminals belonging to the same group only in terms of the data label "Global IP". As for other data labels such as "WLAN adhoc", "Bluetooth", etc., the access controller (at server side) 206 may internally store information indicating standard communication times thereby estimating the communication time.

FIG. 6 illustrates an example of the stored-data database 214 manages by the terminal manager 204 or the like. In the stored-data database 214, a plurality of pieces of information are stored in association with a terminal ID identifying a terminal. The plurality of pieces of information include a network property, stored data, a free space of storage device, a power status, a CPU load, a network load, a password/port number, a hold time, etc.

In the stored-data database 214, the network property is the same in content, for example, as data stored in the connection relation database 212.

The stored data in the stored-data database 214 is a list of data which is stored in the storage device D of each terminal and available to be provided to other terminals. The list of stored data is generated based on a result of capturing data performed by the content server 100 to provide terminals or a result of issuing a data provision request to each terminal.

Data described in the stored-data database 214, such as the size of a free space of the storage device, the power status, the CPU load, the network load, and the like, are detected, for example, based on information periodically transmitted from each terminal together with the network property.

In the stored-data database 214, the password/port number and the hold time are information associated with a data provision request being currently processed. In FIG. 6, a column of password/port number indicates that the terminal (1) is now accessing a port of a port number "5029" of the terminal(2) using a password "xxx" to acquire data "b.mp4". The column of password/port number in FIG. 6 also indicates that the terminal(1) is now accessing a port of a port number "5129" of the terminal(3) using a password "yyy" to acquire data "c.iso".

Figure 7:
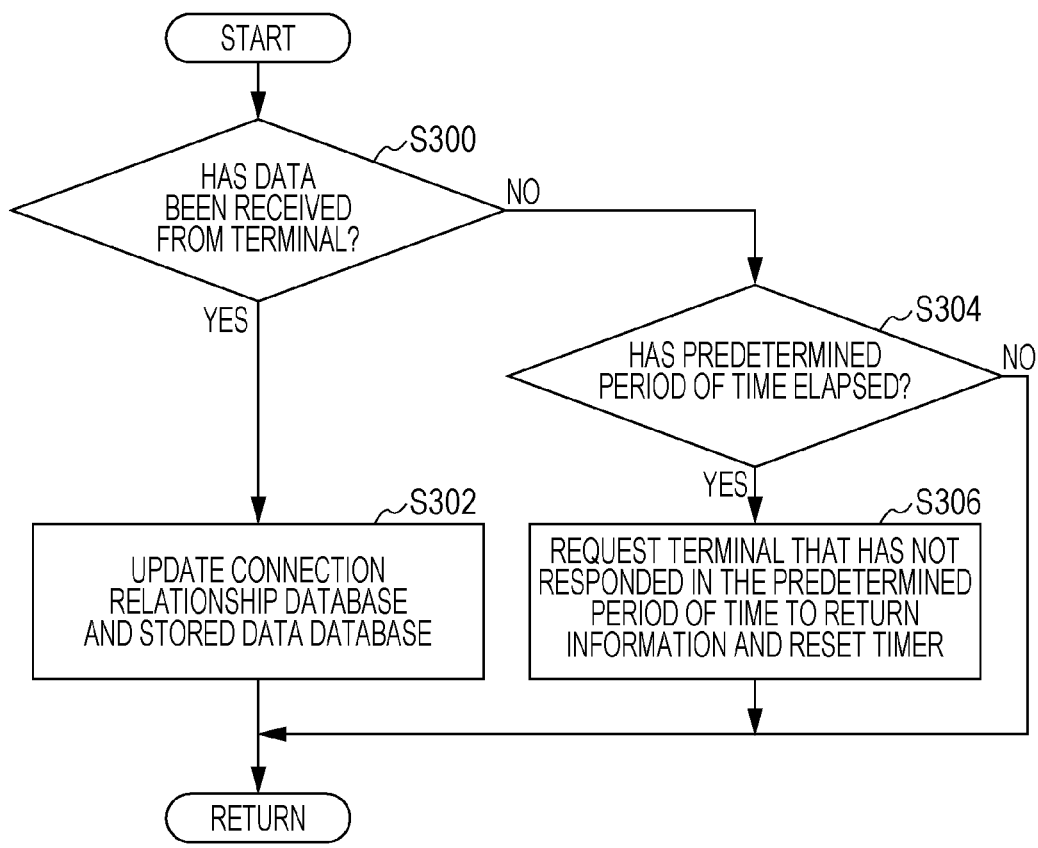
FIG. 7 is a flow chart illustrating an example of a process performed by a terminal manager.

FIG. 7 is a flow chart illustrating an example of a process performed by the terminal manager 204. The process illustrated in the flow chart of FIG. 7 is performed repeatedly, for example, at predetermined periodic intervals.

First, the terminal manager 204 determines whether information associated with the network property and the like has been received from a network information manager of a terminal (S300).

When information from a terminal is received, the terminal manager 204 updates the connection relation database 212 and the stored-data database 214 by editing related items thereof (S302).

On the other hand, in a case where no information is received from a terminal, the terminal manager 204 determines whether a predetermined period of time has elapsed since a previous reference point of time (S304). The previous reference point of time refers to a point of time at which a timer is reset in S306 described later.

In a case where the predetermined period of time has not elapsed since the previous reference point of time, the terminal manager 204 returns to S300 to again perform the determination process. On the other hand, in a case where the predetermined period of time has elapsed since the previous reference point of time, the terminal manager 204 transmits an information transmission request to the terminal that has not responded in the predetermined period of time, and resets the timer measuring the elapsed time (S306). In the process in S306, for example, the terminal manager 204 may wake up the terminal from a sleeping state and make the terminal transmit the information associated with the network property and the like.

Instead of unconditionally transmitting the information transmission request in S306, the terminal manager 204 may set a condition, for example, such that the information transmission request is not transmitted to terminals for which the power status described in the stored-data database 214 indicates that wake on is disabled.

Access Controller (at Server Side)

The access controller (at server side) 206 determines an optimum terminal to which to transmit a data provision request, based on the network property information transmitted by the terminal 10, a data name associated with the data request, the connection relation database 212, and the stored-data database 214 ((5) in FIG. 4). After the determination of the terminal to which to transmit the data provision request, the access controller (at server side) 206 transmits a HTML content including an embedded password to the content server 100 and transmits the data provision request and the password to the terminal 20 ((6) and (8) in FIG. 4).

Figure 8:
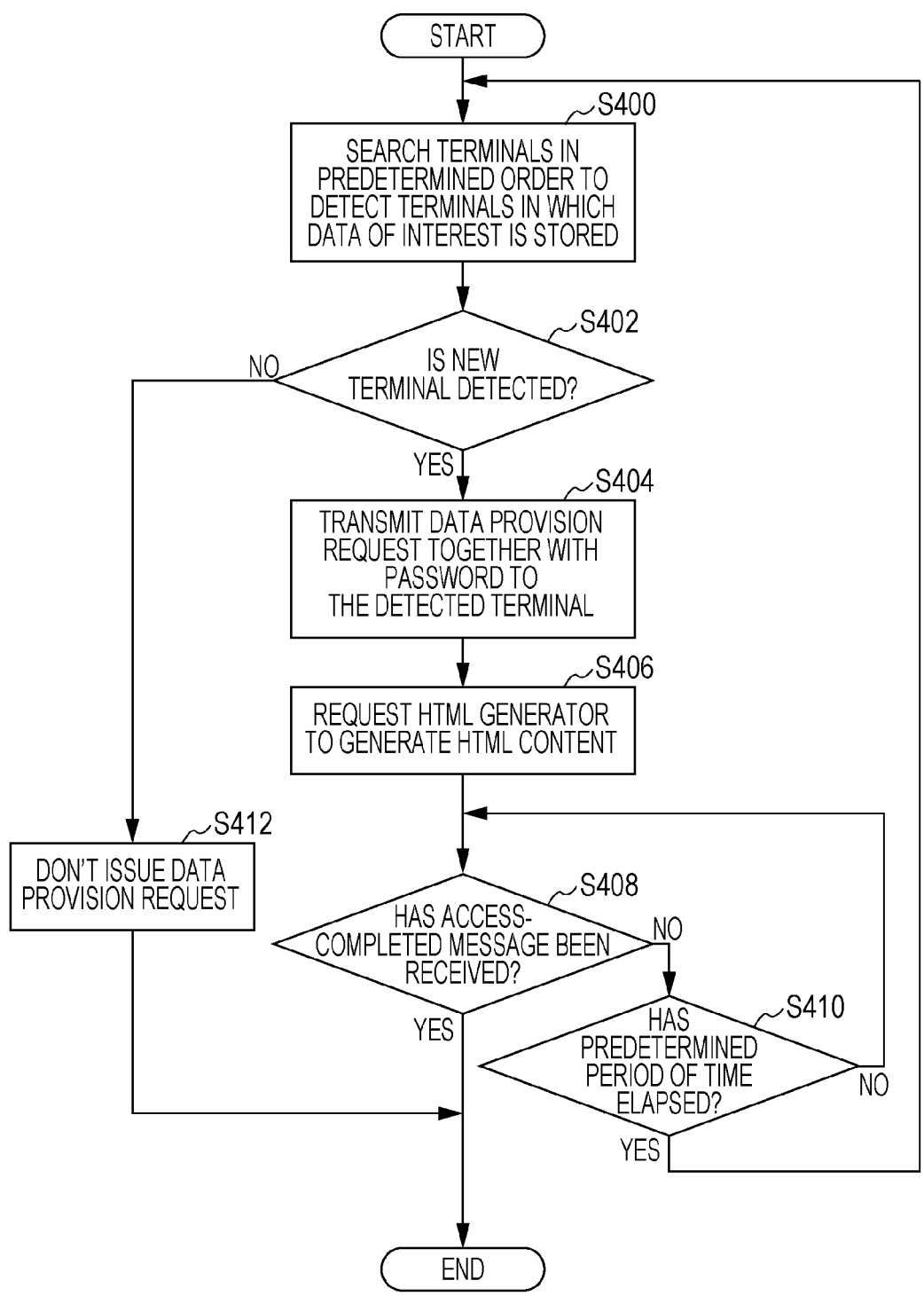
FIG. 8 is a flow chart illustrating an example of flow of a process performed by an access controller (at server side).

FIG. 8 is a flow chart illustrating an example of a flow of a process performed by the access controller (at server side) 206. The process illustrated in the flow chart of FIG. 8 is started, for example, when the access controller (at server side) 206 receives network property information and a data name from the content server 100. The process illustrated in the flow chart of FIG. 8 is also performed, for example, when a password request or the like is again issued from the terminal which is an issuer of the data request.

The process illustrated in the flow chart of FIG. 8 is performed, for example, for each data name (i.e., for each data for which a determination is to be made as to whether to issue a data provision request).

First, the access controller (at server side) 206 searches for terminals in which requested data indicated by the data name is stored, in a predetermined order of terminals (S400). For example, the access controller (at server side) 206 checks terminals in the ascending order of communication time and then in the ascending order of loads at a present point of time to find terminals in which requested data is stored. In a case where the requested data is data predicted to take a long time to transmit, the access controller (at server side) 206 may search for another terminal in which the requested data is stored, by giving higher priority to the load imposed at this point of time than to the communication time.

Referring to FIG. 6, the process in S400 is described. The column of password/port number in FIG. 6 indicates that the terminal(1) is accessing the data "b.mp4" stored in the terminal(2), and the terminal(1) is accessing the data "c.iso" stored in the terminal(3). The column of the network property in FIG. 6 indicates that the terminal(1) and the terminal (2) belong to the same group in terms of "Global IP", and thus it is estimated that the communication time between the terminal(1) and the terminal(2) is shorter than the communication time between the terminal(1) and the terminal(3). However, data with an extension ".iso" is likely to be greater in data size than data with other extensions, and thus the terminal(2) that is short in communication time is not selected but the terminal(3) that is short in CPU load is selected as a terminal to which to send the data provision request. The manner in which the access controller (at server side) 206 selects a terminal to which to issue a data provision request is not limited to that based on the extension as described above. For example, when every data has a greater data size than a reference value, the access controller (at server side) 206 may give high priority to lowness of CPU load in selecting a terminal.

After the process of searching for terminal in S400, the access controller (at server side) 206 determines whether a new terminal (other than a terminal which has already been detected in the processing loop) has been detected (S402).

In a case where a new terminal has been detected, the access controller (at server side) 206 transmits data for a data provision request and a password to the detected terminal (S404). More specifically, the data transmitted in S404 includes a port number at which to receive accessing from other terminals, a data name, a specified period of time, a terminal ID of a data requesting terminal, a password, the specified number of times, etc.

Next, the access controller (at server side) 206 requests the HTML generator 208 to generate an HTML content (S406). In response to receiving the request, the HTML generator 208 generates the HTML content including an embedded password and transmits the generated HTML content to the content server 100.

Thereafter, the access controller (at server side) 206 determines whether an access-completed message has been received from the terminal to which the data and the password were transmitted in S404 (S408). In a case where the access-completed message has not been received, the access controller (at server side) 206 determines whether a predetermined period of time has elapsed since the transmission of the data and the password (S410).

In a case where the predetermined period of time since the transmission of the data and password has elapsed without receiving the access-completed message, the access controller (at server side) 206 returns to S400 to search for a next terminal.

In a case where the access-completed message is received, the access controller (at server side) 206 ends the process illustrated in the flow chart of FIG. 8.

In a case where it is determined in S402 that a new terminal has not been detected, the access controller (at server side) 206 determines not to issue a data provision request (S412). When the data provision request is not issued, a process is performed as will be described later.

Access Controller (at Terminal Side)

When the access controller (at terminal side) 26 receives the data provision request from the cache server 200, the access controller (at terminal side) 26 starts a data provision service as described below ((7) in FIG. 4). The data provision service is a service that transmits data to the terminal 10 in response to the data request (i.e., the second-stage data request** illustrated in FIG. 4 in the previous example) received from the terminal 10 according to the data provision request from the cache server 200. Thus, the terminal 10 is allowed to acquire the requested data by transmitting the password.

Figure 9:
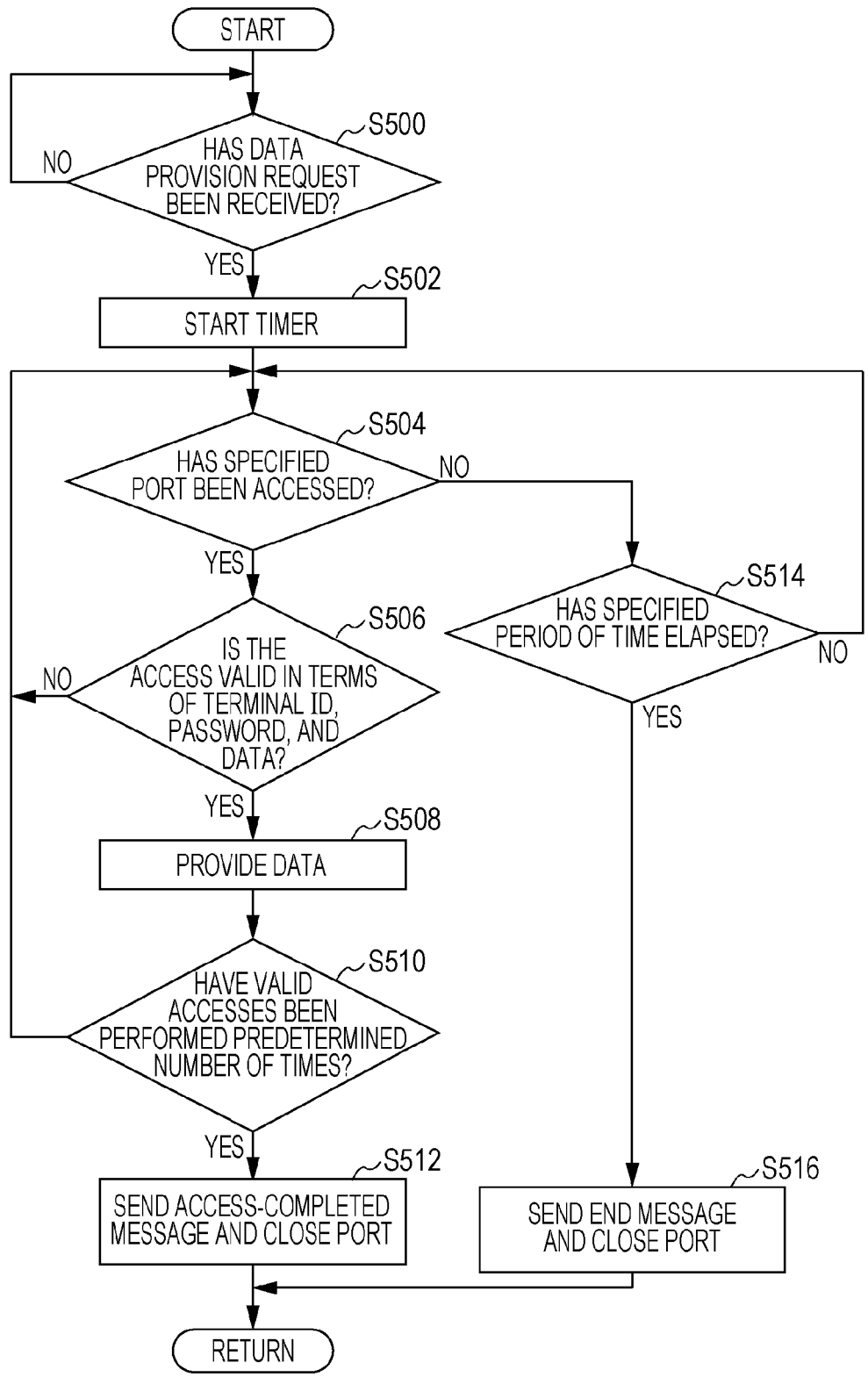
FIG. 9 is a flow chart illustrating an example of flow of a process performed by an access controller (at terminal side).

FIG. 9 is a flow chart illustrating an example of a flow of a process performed by the access controller (at terminal side) 26. The process illustrated in the flow chart of FIG. 9 is performed repeatedly, for example, at predetermined periodic intervals.

First, the access controller (at terminal side) 26 waits for a data provision request to be received from the cache server 200 (S500).

When the data provision request is received from the cache server 200, the access controller (at terminal side) 26 starts measuring elapsed time using a timer (S502).

Next, the access controller (at terminal side) 26 determines whether accessing a port specified by the data provision request has been performed (S504).

In a case where the specified port is accessed, the access controller (at terminal side) 26 determines whether a terminal ID of a terminal which has issued the data request, a password, and data are consistent with the information specified by the data provision request (S506).

In a case where the terminal ID of the terminal which has issued the data request, the password, and the data are consistent, the access controller (at terminal side) 26 makes the network control unit 22 transmit the specified data to the terminal which is the issuer of the data request thereby providing the data (S508).

Thereafter, the access controller (at terminal side) 26 determines valid accessing has been performed a specified number of times (S510). The specified number of times is set when the data provision request is issued. The specified number of times defines a predicted number of times accessing is performed when a plurality of data provision requests are issued at a time by the cache server 200. In a case where only one data provision request is issued, the specified number of times is set to one.

In a case where valid accessing has been performed the specified number of times, the access controller (at terminal side) 26 transmits an access-completed message to the cache server 200 and closes the specified port (S512).

In a case where the determination is S506 or S508 is negative, the access controller (at terminal side) 26 returns to S504 to again perform the determination process.

In a case where it is determined in S504 that accessing the specified port has not been performed, the access controller (at terminal side) 26 determines whether the elapsed time measured by the timer has become equal to or greater than the specified period of time (S514).

In a case where the elapsed time measured by the timer has become equal to or greater than the specified period of time, the access controller (at terminal side) 26 transmits an end message to the cache server 200 and performs a process to close the specified port (S516).

Note that the specified period of time used in the determination in S514 is determined by the cache server 200 depending on the CPU load of the terminal that accepts the data provision request. In the example illustrated in FIG. 6, the specified period of time for the transmission to the terminal(2) with a greater CPU load than the terminal(3) is set to 1000 (seconds), which is shorter than 2000 (seconds) set as the specified period of time for the transmission to the terminal(3). As described above, the access controller (at server side) 206 of the cache server 200 determines the specified period of time such that the smaller the CPU load of the terminal, the greater specified period of time is assigned to the terminal, while the greater the CPU load of the terminal, the smaller specified period of time is assigned to the terminal. This may suppress an increase in CPU load of terminals due to an increase in waiting time in provision of data.

HTML Content

FIG. 10 illustrates an example of an HTML content generated by the HTML generator 208. The HTML content illustrated in FIG. 10 instructs the terminal which has issued the data request to perform an operation such that data "a.jpg" is acquired from the terminal(3) using the password "pwd1". If the data "a.jpg" is successfully acquired, then "OK" is returned to the cache server 200. Furthermore, the HTML content illustrated in FIG. 10 instructs the terminal which has issued the data request to perform an operation such that in a case where the data "a.jpg" is not acquired from the terminal(3) using the password "pwd1", the terminal acquires from the cache server 200 information indicating another terminal that is capable of providing the data.

Figure 11:
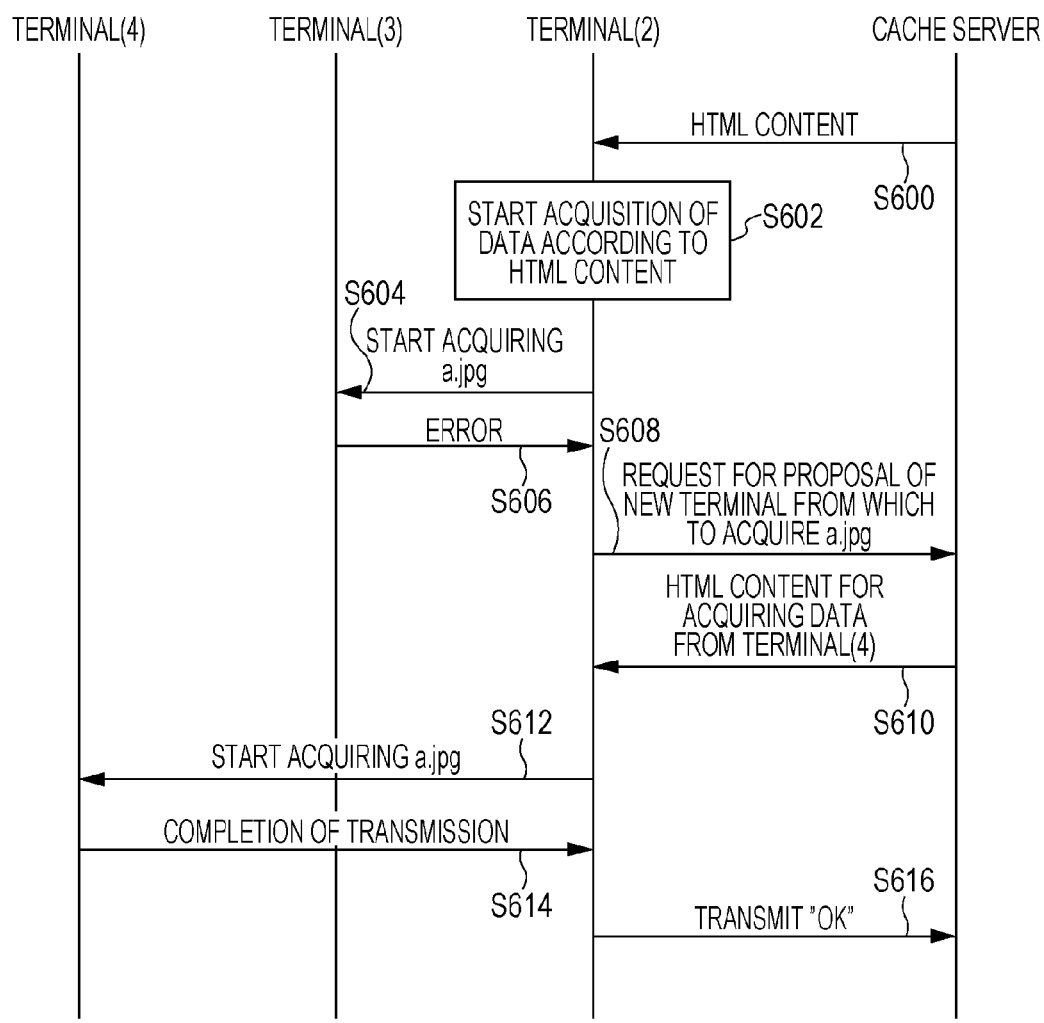
FIG. 11 is a sequence diagram illustrating an example of a flow of a process performed when the HTML content illustrated in FIG. 10 is transmitted to a terminal(2).

FIG. 11 is a sequence diagram illustrating an example of a flow of a process performed in response to transmitting the HTML content illustrated in FIG. 10 to the terminal(2). As illustrated in FIG. 11, first, the process illustrated in the flow chart of FIG. 8 is performed in the cache server 200. Based on a result thereof, the cache server 200 transmits an HTML content for acquiring data "a.jpg" from the terminal(3) (S600).

Next, the terminal(2) starts acquiring data in accordance with the HTML content (S602).

The terminal(2) transmits a password to the terminal(3) to start acquiring the data "a.jpg" (S604). Herein, it is assumed that an error message is returned to the terminal(2) because the terminal(3) stops providing the data provision service, or the data "a.jpg" has already been deleted or for other reasons (S606).

When the terminal(2) receives the error message, the terminal(2) transmits, to the cache server 200, a request for information indicating another terminal from which to acquire the data "a.jpg" (S608).

The cache server 200 again performs the process illustrated in the flow chart of FIG. 8 to transmit, to the terminal(2), an HTML content for acquiring the data "a.jpg" from the terminal(4) (S610).

The terminal(2) transmits a password to the terminal(4) to start acquiring the data "a.jpg" (S612). Herein, let it be assumed that the transmission of the data "a.jpg" from the terminal(4) to the terminal(2) is successfully complete (S614). Thus, the terminal(2) transmits data indicating "OK" to the cache server 200 (S616).

In the case where it is failed to find the terminal to which to transmit the data provision request, the access controller (at server side) 206 determines that the data provision request is not issued to the terminal. FIG. 12 illustrates an example of an HTML content generated by the HTML generator 208 when the data provision request is not issued to the terminal. The HTML content illustrated in FIG. 12 instructs the terminal which has issued the data request to perform an operation such that the data "a.jpg" is acquired from the cache server 200, but if the acquisition is failed, the data "a.jpg" is acquired from the content server 100. Furthermore, the HTML content illustrated in FIG. 12 instructs the terminal which has issued the data request to perform an operation such that also in a case where the data "a.jpg" is acquired from either one of the cache server 200 and the content server 100, "OK" is returned to the cache server 200.

When the terminal which is the issuer of the data request acquires the data and returns "OK" to the cache server 200 (or when an access-completed message is transmitted from the terminal at the data provision side), the content of the stored-data database 214 is updated. FIG. 13 illustrates the content of the stored-data database 214 that has been updated from that illustrated in FIG. 6 so as to reflect the change that the terminal(1) has completed the acquisition of the data "b.mp4" and the data "c.iso". As illustrated in FIG. 13, when it is detected that the terminal(1) has acquires the data "b.mp4" and the data "c.iso", the terminal manager 204 of the cache server 200 adds data to a column of the stored data to indicate that the terminal(1) stores the data "b.mp4" and the data "c.iso".

Usage Status Monitor

The terminal at the data providing side (hereinafter, referred to as the terminal 20) is used as a user terminal. This means there is a possibility that a processing load to perform an operation specified by a user and a processing load to provide specified data occur simultaneously. This may result in a reduction in performance.

An example of an operation specified by the user is to display information on a screen of a display in response to an input operation performed by the user on the input device G. Such an operation is irrelevant to an operation performed to provide the data provision service.

The usage status monitor 30 monitors the status of the terminal 20 over a period in which the access controller (at terminal side) 26 operates in response to a data provision request. When it is detected that the status of the terminal 20 satisfies a predefined condition, the usage status monitor 30 instructs the terminal 20 to stop the data provision service and the usage status monitor 30 informs the cache server 200 that the data provision service is stopped.

Figure 14:
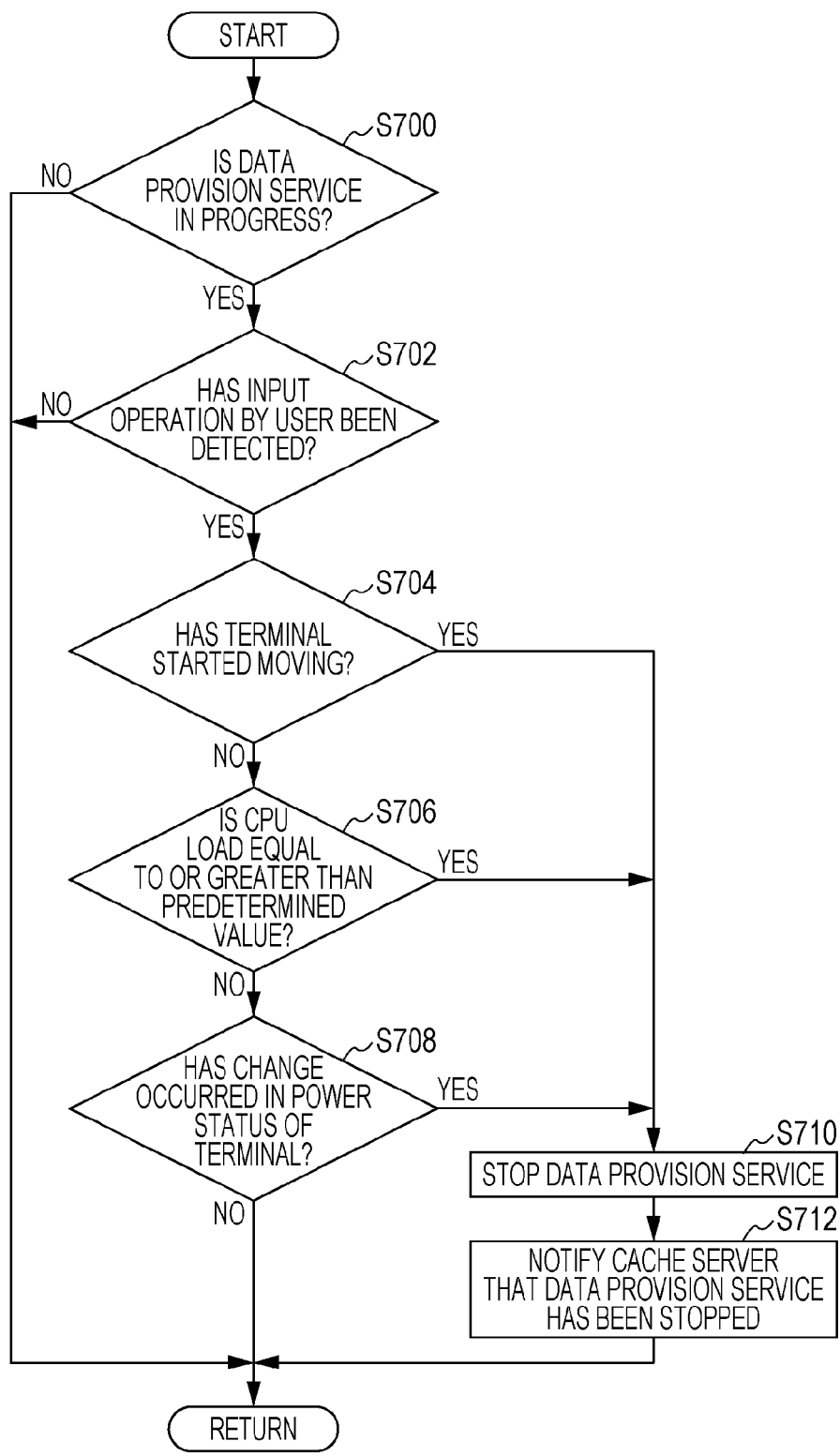
FIG. 14 is a flow chart illustrating an example of a flow of a process performed by a usage status monitor.

FIG. 14 is a flow chart illustrating an example of a flow of a process performed by the usage status monitor 30. The process illustrated in the flow chart of FIG. 14 is performed repeatedly, for example, at predetermined periodic intervals.

First, the usage status monitor 30 determines whether a data provision request has been issued to the access controller (at terminal side) 26 but an access-completed message or an end message has not yet been transmitted, i.e., the data provision service is in process (S700). In a case where the data provision service is not in process, the usage status monitor 30 returns from the routine illustrated in the flow chart of FIG. 14.

On the other hand, in a case where the data provision service is in process, the usage status monitor 30 determines whether it is detected that an input operation is performed by a user on the input device G, such as a keyboard, a mouse, a button, a touch pad, a touch panel, a microphone, or the like, of the terminal 20 (S702). More specifically, the usage status monitor 30 determines, for example, whether it is detected that an input operation has been performed in a period from a few minutes ago to the present time. Note that the condition monitored by the usage status monitor 30 is not limited to that described above, but the usage status monitor 30 may employ other conditions in determining whether it is detected that an input operation has been performed. In a case where no input operation is detected, the usage status monitor 30 returns from the routine illustrated in the flow chart of FIG. 14.

In a case where an input operation by a user on the input device G is detected, the usage status monitor 30 determines whether the terminal 20 has started moving (S704). The moving of the terminal may include one or both of a change in a connection relationship and a change in physical location of the terminal. For example, the usage status monitor 30 may detect a change in connection relationship based on information provided from the network information manager 24. On the other hand, for example, the usage status monitor 30 may detect a change in physical location by referring to an output value of an acceleration sensor used in controlling unloading of a head of an HDD.

In a case where it is detected that the terminal 20 has started moving, the usage status monitor 30 instructs the access controller (at terminal side) 26 to stop the data provision service (S710), and the usage status monitor 30 informs the cache server 200 that the data provision service is stopped (S712).

If the access controller (at terminal side) 26 receives the instruction to stop the data provision service, then the access controller (at terminal side) 26 does not accept further accessing a port specified in a data provision request from the cache server 200. In a case where the cache server 200 issues a new data provision request in which the same port is specified, the usage status monitor 30 may determine whether the situation allows the request to be accepted. If the situation allows the request to be accepted, the usage status monitor 30 may start the data provision service using the specified port.

In a case where the terminal 20 does not start moving, the usage status monitor 30 determines whether the CPU load of the terminal 20 is equal to or greater than a predetermined value (S706).

In a case where the CPU load of the terminal 20 is equal to or greater than the predetermined value, the usage status monitor 30 instructs the access controller (at terminal side) 26 to stop the data provision service (S710), and the usage status monitor 30 informs the cache server 200 that the data provision service is stopped (S712).

In a case where the CPU load of the terminal 20 is less than the predetermined value, the usage status monitor 30 determines whether a change has occurred in power status of the terminal 20 (S708). The power status may include, for example, a normal operation state, a pausing state, a sleeping state, a shutdown (power-off) state, etc.

When a change in power status of the terminal 20 occurs, the usage status monitor 30 instructs the access controller (at terminal side) 26 to stop the data provision service (S710), and the usage status monitor 30 informs the cache server 200 that the data provision service is stopped (S712).

The determination process in S704 and S708 is performed to detect a start of moving or a change in status that may occur in a period from a previous execution to a current execution of the routine in the iteration of the routine illustrated in the flow chart of FIG. 14.

In a case where the determination in S702 is negative and also in a case where the determinations in S704 to S708 are all negative after the affirmative determination in S702, the usage status monitor 30 returns from the routine illustrated in the flow chart of FIG. 14.

In the terminal 20, as described above, when the status of the terminal 20 satisfies conditions including a condition that an input operation by a user on the input device G is detected, the usage status monitor 30 instructs the terminal 20 to stop the data provision service. This makes it possible for the terminal 20 to maintain high performance in operation specified by the user.

When the cache server 200 receives the notification that the data provision service is to be stopped, the cache server 200 controls the data provision request issued to the terminal 20 for a particular period, for example, by setting a flag in a column associated with the terminal 20 in the stored-data database 214 or by intentionally increasing the CPU load. This reduces the probability that the terminal 20 receives a data provision request thereafter, and makes it possible for the terminal 20 to maintain a high-performance state in operation specified by a user.

SUMMARY

In the information processing apparatus, the data provision method, and the data provision program according to the embodiments described above, when the status of the terminal 20 satisfies the predefined condition, the data provision service is stopped thereby ensuring that the terminal 20 maintains the high performance in the operation specified by the user.

Note that the terminal 20 in the above-described embodiments is an example of an "information processing apparatus", the network control unit 22 and the access controller (at terminal side) 26 are examples of a "provision unit", and the usage status monitor 30 is an example of a "stopping unit". The storage device D in the embodiments described above is an example of a "storage unit", and the input device G is an example of an "input unit". Note that the "input unit" is not limited to that realized by hardware such as the input device G, but the "input unit" may be an input interface in the terminal 20.

Furthermore, the terminal 10 in the embodiments described above is an example of an "apparatus that is an issuer of the data request", and the content server 100 and the cache server 200 are examples of an "information providing apparatus".

The flow charts illustrated in FIGS. 7, 8, 9, and 14 are merely examples. Many modifications or changes such as a change in order of processes are possible as long as similar results are obtained.

The embodiments have been described above with reference to specific examples. It should be understood that the embodiments are not limited to the details of those examples described above, but various changes and substitutions are possible without departing from the spirit and scope of the invention.

For example, although the access controller (at server side) 206, which is a main part in issuing a data provision request, is assumed to operate on the cache server 200, a unit that provides a similar function may be disposed in the content server 100.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
    a plurality of apparatuses coupled via a network to each other, each of the plurality of apparatuses including an interface coupled to the network, a first memory, and a first hardware processor coupled to the first memory; and
    an information providing apparatus coupled via the network to the plurality of apparatuses, the information providing apparatus including a second memory and a second hardware processor coupled to the second memory, the second hardware processor being configured to control a provision of data among the plurality of apparatuses, wherein
    the second hardware processor of the information providing apparatus is configured to:
        upon receiving, from a first apparatus, a first data request for acquiring data, determine a second apparatus that is to provide the requested data to the first apparatus,
        transmit, to the second apparatus, a provision request for requesting the second apparatus to provide the first apparatus with the requested data stored in the first memory of the second apparatus, the provision request including security information that includes a password and an identifier identifying the requested data, and
        transmit the security information to the first apparatus,
    the first hardware processor of the first apparatus is configured to:
        transmit the first data request to the information providing apparatus, and upon receiving the security information from the information providing apparatus, transmit a second data request including the security information to the second apparatus, so as to receive the requested data from the second apparatus, and the first hardware processor of the second apparatus is configured to:
upon receiving the provision request including the security information via the network from the information providing apparatus, set the security information to the second apparatus,
upon receiving the second data request from the first apparatus, determine whether the security information included in the second data request is consistent with the security information set to the second apparatus, and start the provision of the data stored in the first memory of the second apparatus to the first apparatus when the security information included in the second data request is consistent with the security information set to the second apparatus, and
upon detecting an input operation performed by a user of the second apparatus, determine whether a predefined condition is satisfied, and stop the provision of the data to other apparatuses when it is determined that the predefined condition is satisfied, wherein the predefined condition is a determination that the second apparatus has started moving, the moving of the second apparatus including at least one of a change in a connection relationship of the second apparatus and a change in physical location of the second apparatus, the second hardware processor of the information providing apparatus is configured to:
determine, for each of the plurality of apparatuses, a monitoring time for monitoring reception of the second data request, depending on a processing load of the first hardware processor of the each apparatus, and provide the second apparatus with the determined monitoring time by including the monitoring time in the provision request, and
the first hardware processor of the second apparatus is configured to close a port for receiving the second data request when the monitoring time has elapsed from a time of receiving the provision request from the information providing apparatus.

2. The system of claim 1, wherein when stopping the provision of the data to the other apparatuses, the first hardware processor of the second apparatus further transmits information to the information providing apparatus to notify that the provision of the data is stopped.

3. The system of claim 1, wherein
state information indicating a state of each of the plurality of apparatuses is periodically transmitted to the information providing apparatus to cause the information providing apparatus to determine, based on the state information, optimum one of the plurality of apparatuses to which to issue the provision request; and
upon stopping the provision of data to the other apparatuses, the first hardware processor of each apparatus transmits, to the information providing apparatus, provision-stopping information indicating that the provision of data to the other apparatuses has been stopped, to cause the information providing apparatus to suppress issuing the provision request to the plurality of apparatuses.

4. A non-transitory computer-readable recording medium storing a program for causing a first computer included in each of a plurality of apparatuses that are coupled via a network to each other, and a second computer included in an information providing apparatus for controlling a provision of data among the plurality of apparatuses, to execute a process comprising:

causing the second computer of the information providing apparatus to:
upon receiving, from a first apparatus, a first data request for acquiring data, determine a second apparatus that is to provide the requested data to the first apparatus,
transmit, to the second apparatus, a provision request for requesting the second apparatus to provide the first apparatus with the requested data stored in the first memory of the second apparatus, the provision request including security information that includes a password and identifier identifying the requested data, and
transmit the security information to the first apparatus;

causing the first apparatus to:
transmit the first data request to the information providing apparatus, and
upon receiving the security information from the information providing apparatus, transmit a second data request including the security information to the second apparatus, so as to receive the requested data from the second apparatus;

causing the second apparatus to:
upon receiving the provision request including the security information via the network from the information providing apparatus, set the security information to the second apparatus,
upon receiving the second data request from the first apparatus, determine whether the security information included in the second data request is consistent with the security information set to the second apparatus, and start the provision of the data stored in the second apparatus to the first apparatus when the security information included in the second data request is consistent with the security information set to the second apparatus, and
upon detecting an input operation performed by a user of the second apparatus, determine whether a predefined condition is satisfied, and stop the provision of the data to other apparatuses when it is determined that the predefined condition is satisfied, wherein the predefined condition is a determination that the second apparatus has started moving, the moving of the second apparatus including at least one of a change in a connection relationship of the second apparatus and a change in physical location of the second apparatus;

causing the second computer of the information providing apparatus to:
determine, for each of the plurality of apparatuses, a monitoring time for monitoring reception of the second data request, depending on a processing load of the each apparatus, and
provide the second apparatus with the determined monitoring time by including the monitoring time in the provision request; and
causing the second apparatus to close a port for receiving the second data request when the monitoring time has elapsed from a time of receiving the provision request from the information providing apparatus.

5. The non-transitory computer-readable medium according to claim 4, wherein the process includes causing the second apparatus to, when stopping the provision of the data to the other apparatuses, transmit information to the information providing apparatus to notify that the provision of the data is stopped.

6. A method executed in a network system including a plurality of apparatuses and an information providing apparatus configured to provide data among the plurality of apparatuses via a network, the method comprising:
  causing the information providing apparatus to:
    upon receiving, from a first apparatus, a first data request for acquiring data, determine a second apparatus that is to provide the requested data to the first apparatus,
    transmit, to the second apparatus, a provision request for requesting the second apparatus to provide the first apparatus with the requested data stored in the first memory of the second apparatus, the provision request including security information that includes a password and identification information identifying the requested data, and
    transmit the security information to the first apparatus;
  causing the first apparatus to:
    transmit the first data request to the information providing apparatus, and
    upon receiving the security information from the information providing apparatus, transmit a second data request including the security information to the second apparatus, so as to receive the requested data from the second apparatus;
  causing the second apparatus to:
    upon receiving the provision request including the security information via the network from the information providing apparatus, set the security information to the second apparatus,
    upon receiving the second data request from the first apparatus, determine whether the security information included in the second data request is consistent with the security information set to the second apparatus, and start the provision of the data stored in the second apparatus to the first apparatus when the security information included in the second data request is consistent with the security information set to the second apparatus, and
    upon detecting an input operation performed by a user of the second apparatus, determine whether a predefined condition is satisfied, and stop the provision of the data to other apparatuses when it is determined that the predefined condition is satisfied, wherein the predefined condition is a determination that the second apparatus has started moving, the moving of the second apparatus including at least one of a change in a connection relationship of the second apparatus and a change in physical location of the second apparatus;
  causing the information providing apparatus to determine, for each of the plurality of apparatuses, a monitoring time for monitoring reception of the second data request, depending on a processing load of the each apparatus; and
  causing the second apparatus to close a port for receiving the second data request when the monitoring time determined therefore has elapsed from a time of receiving the provision request from the information providing apparatus.

7. The data provision method according to claim 6, wherein the method includes:
  causing the second computer of the information providing apparatus to:
    when the data associated with the first data request has a size equal to or less than a first predetermined value, transmit the provision request preferentially to a third apparatus which is one of multiple apparatuses storing the data associated with the first data request and whose communication time is shorter than that of at least one of the multiple apparatuses, and
    when the data associated with the first data request has a size equal to or greater than a second predetermined value, transmit the provision request preferentially to a fourth apparatus which is one of the multiple apparatuses storing the data associated with the first data request and whose processing load is smaller than that of at least one of the multiple apparatuses.

8. The method according to claim 6, wherein
state information indicating a state of each of the plurality of apparatuses is periodically transmitted to the information providing apparatus to cause the information providing apparatus to determine, based on the state information, optimum one of the plurality of apparatuses to which to issue the provision request;
the method includes:
  causing the first computer of the second apparatus to, upon stopping the provision of data to the other apparatuses, transmit, to the information providing apparatus, provision-stopping information indicating that the provision of data to the other apparatuses has been stopped; and
  causing the second computer of the information providing apparatus to, upon receiving the provision-stopping information, suppress issuing the provision request to the plurality of apparatuses.

* * * * *